United States Patent [19]

Arias et al.

[11] Patent Number: 4,632,914
[45] Date of Patent: Dec. 30, 1986

[54] METHOD OF PREPARING A HYDROCRACKING CATALYST

[75] Inventors: Beatriz Arias, Caracas; Humberto Kum, Los Teques; Roberto Galiasso, San Antonio de los Altos, all of Venezuela

[73] Assignee: Intevep, S.A., Caracas, Venezuela

[21] Appl. No.: 700,640

[22] Filed: Feb. 12, 1985

Related U.S. Application Data

[63] Continuation-in-part of Ser. No. 393,500, Jun. 29, 1982, Pat. No. 4,499,202.

[51] Int. Cl.$^4$ .......................... B01J 21/04; B01J 23/28; B01J 27/18
[52] U.S. Cl. ..................................... 502/211; 208/111
[58] Field of Search .................. 502/211, 213, 242; 208/111, 112, 114

[56] References Cited

U.S. PATENT DOCUMENTS

| | | | |
|---|---|---|---|
| 2,454,056 | 11/1948 | Greger | 502/208 |
| 3,222,297 | 12/1965 | Allegrini et al. | 502/208 |
| 4,102,822 | 7/1978 | Mulaskey | 502/323 X |

Primary Examiner—W. J. Shine
Attorney, Agent, or Firm—James G. Staples

[57] ABSTRACT

The invention, in one aspect, relates to a particular method for the preparation of a hydrocracking catalyst, using a high iron content bauxite as a basis. This bauxite is ground and screened to a specific size and mixed with up to three types of additives: a promoter additive of the P, Mo, Co, Ni, W type, optionally a hardener additive of the phosphoric acid type, and optionally a lubricant and pore-generating additive of the polyvinyl-alcohol, polyethylene-glycol, starch type. The additives are blended with the bauxite before, or during the extrusion of the blend for the formation of pellets. The pellets are subjected to drying and calcination under controlled conditions for their activation.

The obtained catalyst offers a good mechanical strength, a high content in macropores and a high activity, specifically for the hydrocracking of heavy Venezuelan crudes or residues.

Another aspect of the invention relates to a hydrocracking process utilizing the catalysts prepared by the aforesaid method for the conversion of such heavy crudes or residues, in the presence of added hydrogen to products of relatively lower boiling ranges and relatively lower sulfur and vanadium contents.

10 Claims, 4 Drawing Figures

EXAMPLE 1
CONTINUOUS PLANT ACTIVITY (BENCH SCALE)

EXAMPLE 2
CONTINUOUS PLANT ACTIVITY (BENCH SCALE)

EXAMPLE.3
CONTINUOUS PLANT ACTIVITY (BENCH SCALE)

METHOD OF PREPARING A HYDROCRACKING CATALYST

REFERENCE TO RELATED APPLICATION

This application is a continuation-in-part of our application Ser. No. 393,500, filed June 29, 1982, now U.S. Pat. No. 4,499,202.

SCOPE OF THE INVENTION

This invention relates to a novel method of preparing a catalyst for the hydrocracking of heavy crudes and/or their atmospheric or vacuum residues and to the hydrocracking, with said catalyst, of hydrocarbon feedstocks with a relatively high content of vanadium, sulfur and asphaltenes, such as the Cerro Negro, Morichal, Suata, Irapa Base, and Boscan crudes, and their residues.

DESCRIPTION OF THE PRIOR ART

Materials of the bauxite type have been suggested and used in different processes as supports, catalysts or contact materials.

U.S. Pat. No. 3,322,665 shows the conversion of high boiling feedstocks to lower boiling feedstocks in the presence of a catalyst which comprises one or more metallic components, such as nickel, cobalt, molybdenum or tungsten on an alumina support. The preferred support is activated alumina or alumina gel, but bauxite is also disclosed. However, there is no disclosure of the method of catalyst preparation, or of the porosity or surface chemical analysis of the catalyst.

U.S. Pat. No. 3,819,509 discloses obtaining a low sulfur content fuel oil from a petroleum residue with a high metal content in two reaction zones. A hydrodemetallization is carried out in the first reaction zone, for which an activated bauxite or alumina is used. The percentage composition by mass of the mentioned bauxite is $Al_2O_3 = 72-76\%$, $Fe_2O_3 = 10-18\%$, $TiO_2 = 4\%$, and $SiO_2 = 5-9\%$. For the second reaction zone, in which hydrodesulfurization is carried out, conventional $Co-Mo/Al_2O_3$ catalysts of low porosity are used. There is no disclosure of any specific promoter additives or of any specific porosity levels in the bauxite hydrodesulfurization catalyst.

U.S. Pat. No. 3,901,792 likewise discusses two reaction zones for the demetallization and desulfurization of crude or atmospheric residues. The pore size distribution of the catalyst in the first reaction zone, for demetallization, is greater than that in the second reaction zone, but there is no disclosure of any method of catalyst preparation that could produce catalysts of the high porosity obtainable by the instant invention.

U.S. Pat. No. 3,964,995 discloses a first stage hydrodesulfurization in the presence of an activated bauxite catalyst sold under the trade name "Porocel" (Minerals and Chemicals Corporation of America), followed by a second state in which a non-porous catalyst is used. The "Porocel" catalyst is disclosed as containing oxides of iron, titanium and silicon as promoters.

U.S. Pat. No. 3,893,911 discloses the demetallization of hydrocarbon feedstocks with a high metal content. The preferred catalyst in this patent is also the aforementioned "Porocel." The emphasis in U.S. Pat. No. 3,893,911 in on continuously regenerating and replacing the catalyst. It does not relate to catalyst preparation, and describes no special type of activation or resultant surface composition of the catalyst.

U.S. Pat. No. 4,217,206 discloses the demetallization of Venezuelan crudes with a bauxite catalyst containing 1% of molybdenum. The patent relates to a method for controlling reaction conditions and times in order to make sure that the initial demetallization does not exceed 75%. The object of this patent is to lower catalyst replacement rates rather than to improve residue conversion. The patent does not specify the method of preparation of the catalyst, or indicate its porosity; and it does not describe the catalyst surface composition.

U.S. Pat. No. 4,196,072 discloses the hydroconversion of hydrocarbons using inorganic poly acids or salts thereof, containing Mo or W, which are used in combination with phosphoric acid. In this reference, bauxites or similar materials are not used.

SUMMARY OF THE INVENTION

This invention provides a method for the preparation of a hydrocracking catalyst, using a high iron content bauxite as a base and incorporating a promoter additive of the group consisting of P, Mo, Co, Ni and mixtures thereof. Through the combination of catalyst preparation steps, the catalyst has a high porosity and has a surface composition with higher concentrations of the promoter additives than the catalyst body, generally. This, in turn, allows for high catalyst activity.

The catalyst preparation method produces a catalyst of high mechanical strength, a high content of macropores and a high specific activity for the hydrocracking of Venezuelan heavy crudes and residues.

The hydrocracking catalyst produced by the preferred method of one aspect of this invention is in pellet form and has a surface area of about 90 to about 250 square meters per gram, a pore volume of about 0.25 to about 0.55 cubic centimeters per gram, a real density of about 3.00 to about 5.00 grams per cubic centimeter, and an apparent density of about 1.50 to about 2.00 grams per cubic centimeter. It contains aluminum in an overall concentration of about 25 to about 35 weight percent, iron in an overall concentration of about 5 to about 15 weight percent, silicon in an overall concentration of about 1 to about 10 weight percent, and titanium in an overall concentration of about 0.6 to about 5 weight percent. It also contains a promoter which is a member of the group consisting of molybdenum and phosphorus or a mixture thereof. The molybdenum, if present, is in an overall concentration of about 1 to about 10 weight percent, and the phosphorus, if present, is in an amount of about 1 to about 8 weight percent. The catalyst pellet surface concentration of the promoter is higher than the overall concentration of the promoter. The atomic ratio of molybdenum to aluminum at the pellet surface is in the range of about 0.03 to about 0.09 when molybdenum is present in the catalyst; and the atomic ratio of phosphorus to aluminum at the pellet surface is in the range of about 0.10 to about 0.60 when phosphorus is present in the catalyst.

In the catalyst preparation method of this invention, the first step is to grind and screen the bauxite with a high iron content to a specific size. The next step in to add a promoting additive and, if desired, a hardening additive and a lubricating and pore-generating additive, together with sufficient water to provide a suitable consistency for extrusion.

The aforementioned materials are then thoroughly blended and subsequently extruded to pellets no greater than about ⅛ inch in diameter. The extruded pellets are then dried and calcined to produce the final catalyst.

The promoter additive may be a material containing phosphorus, molybdenum, cobalt or nickel, or mixture thereof. The hardener additive, when used, may be phosphoric acid, aluminum phosphate, aluminum nitrate, ammonium phosphate or nitric acid. The lubricating and pore-generating additive, when used may be polyvinyl alcohol, starch, polyethylene glycol or cellulose.

This invention also provides a method of hydrocracking in which the catalyst prepared by the foregoing method is utilized. In the hydrocracking method, a feedstock, containing high boiling hydrocarbons and relatively high amounts of sulfur and of metals (particularly vanadium), is brought into contact with the catalyst, in the presence of added hydrogen, at elevated temperatures and pressures. In accordance with the method of this invention, substantial reduction of high boiling hydrocarbons to lower boiling hydrocarbons is obtained together with substantial reduction of sulfur and vanadium levels. If desired, however, the hydrocracking method of this invention may be preceded or followed by separate treatments for reducing the level of sulfur and/or vanadium in the feedstock.

DETAILED DESCRIPTION OF THE INVENTION

This invention relates to a novel method of preparing a hydrocracking catalyst by successive blending, extrusion, drying and calcination steps. It also relates to a novel hydrocracking process utilizing the catalyst prepared by the aforesaid method.

Figure 1:
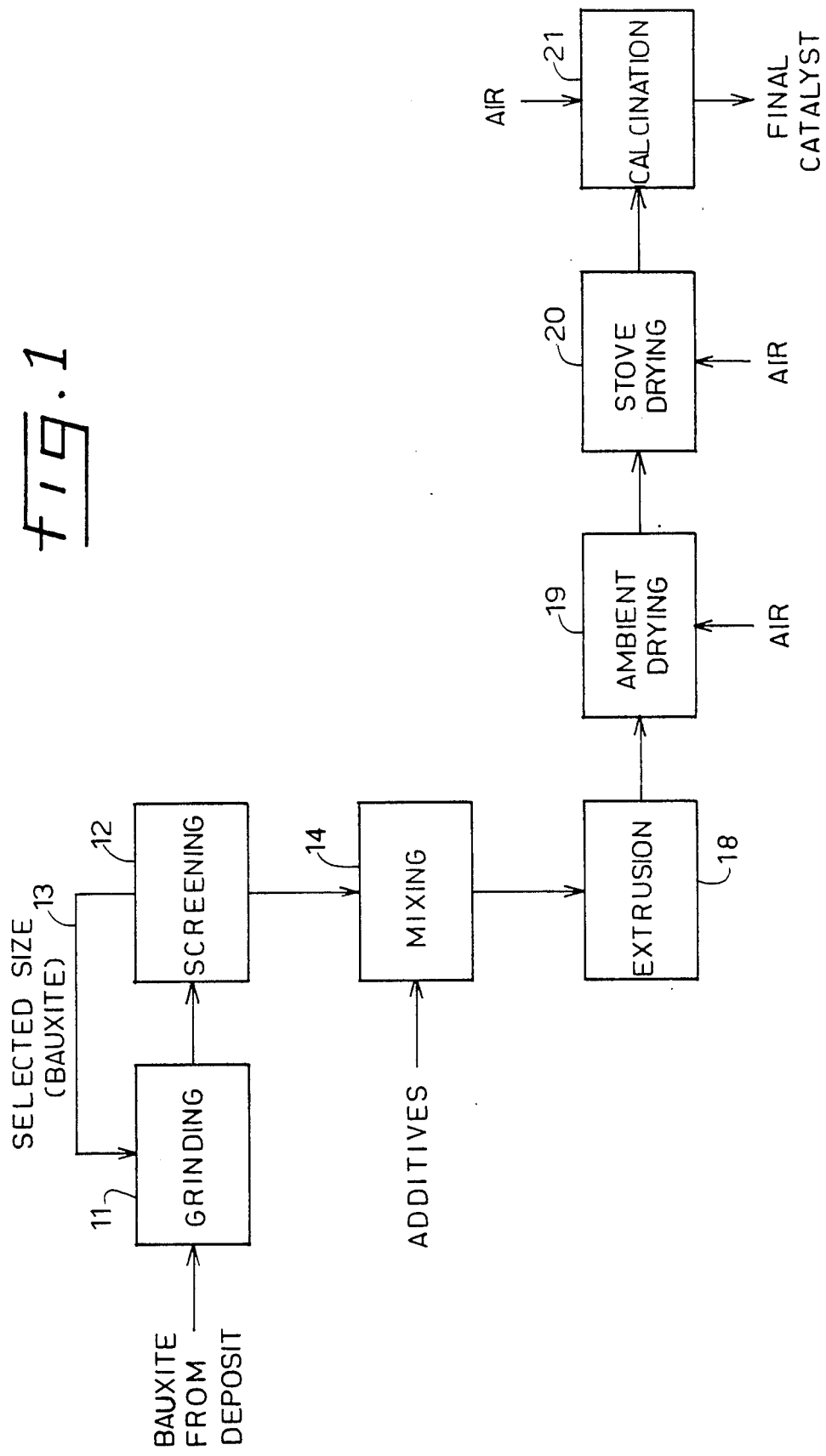
FIG. 1 is a schematic diagram showing the steps of preparing a catalyst according to the method of the invention.

Referring to FIG. 1 to illustrate the catalyst preparation method, the base material is a bauxite with a high iron content, whose elemental percentage composition by mass (present as oxides) is in the following ranges:

|  | and preferably: |
|---|---|
| Al = 22–47% | Al = 22–35% |
| Fe = 5–28% | Fe = 7–20% |
| Si = 1–13% | Si = 1–5% |
| Ti = 1–7% | Ti = 1–5% |

This sample is ground in grinding step 11 and screened in a screening step 12 to a size of less than 500 microns, preferably less than 150 microns. Bauxite particles of inappropriate size are returned via pathway 13 to the grinding step 11. Up to three different types of additives are added in mixing step 14 to the bauxite:

1. A promoter additive, which is preferably molybdenum, in quantities from 1–7% by weight based on the weight of bauxite. Nickel, cobalt or phosphorus also may be used in the same concentrations singly or in admixture with one another.

2. A hardener additive, which is preferably phosphoric acid, in quantities from 1–8% by weight as phosphate. Ammonium phosphate, aluminum phosphate, nitric acid or aluminum nitrate may also be used, the latter two materials calculated as nitrate. The hardener additive may be omitted when phosphorus, in the form of phosphoric acid or a phosphate, is used as the promoter additive.

3. A lubricating and porosity-generating additive, which preferably is starch, in quantities from 1 to 15% by weight based on the weight of bauxite, preferably about 3 to about 10% by weight. Cellulose, polyvinyl alcohol or polyethylene glycol also may be used in the same quantities. The lubricating and porosity-generating additive may be omitted when other constituents and the selected processing conditions permit extrusion without excessive pressure and provide adequate pore formation.

The sequence of preparation at step 14 is as follows: A molybdenum salt, preferably technical grade ammonium heptamolybdate (in adequate quantities) is dissolved in a phosphoric acid solution in such a quantity that the desired percentage of phosphate is obtained. This solution, in an amount to provide the desired molybdenum level, is added to the ground bauxite along with the necessary quantities of starch and water. The resultant paste is homogenized by mixing means until the correct rheology for extrusion is obtained.

The extrusion phase 18 is performed at a pressure of less than 50 kilograms/cm$^2$ and at a temperature between 30° and 40° C. (86° and 104° F.)

After the pellets are extruded, they must be dried and calcined for the activation of the catalyst. The pellets are first dried in ambient drying stage 19 at ambient or room temperature for periods of from 8 to 72 hours, in order to achieve an adequate water evaporation without formation of cracks. Next, the pellets are dried in stove-drying stage 20 at elevated temperatures of about 60° to about 120° C. (140° to 248° F.) for periods of about 8 to about 72 hours to start the formation of pseudo-boehmite and to start the surface reactions with the base material.

The pellets then pass to calcination stage 21, taking place in ovens at temperatures in the range of about 300° C. to about 600° C. (572° to 1112° F.) for time periods in the range of about 3 to about 24 hours, in order to generate a large number of pores in sizes larger than 100 Angstroms, and to adequately interconnect said pores. The preferred calcination method is to heat the sample at a rate of about 5° C./minute up to 500° C. (932° F.) and then to hold the pellets at this temperature for about 8 hours. The air flow through the calcination ovens must be such that the heat transfer coefficient is higher than about 15–40 Kcal/(hour) (m$^2$) (°C.).

If desired, the stove-drying stage and the calcination stage may take place successively in the same stoves, or ovens. The processing can be considered to be drying as long as appreciable moisture continues to be removed from the pellets and as long as the temperature does not greatly exceed 100° C. Calcination, on the other hand, is heat treatment at temperatures sufficiently high (e.g., well above 100° C.) to decompose hydrates, carbonates and like compounds, and to expel volatile materials present.

The chemical composition on the whole of the final catalyst pellets 23 is within the following weight ranges, the elements hereunder listed being present as oxides:

|  | and preferably: |
|---|---|
| 25-35% Al | 25-30% Al |
| 5-15% Fe | 7-12% Fe |
| 1-10% Si | 1-5% Si |
| 0.6-5% Ti | 1-3% Ti |
| 1-10% Mo | 1-7% Mo |
|  | 1-8% P, more preferably 2-5% P |

The physical characteristics of the pellets are within the following ranges:

| Surface Area = | 90-250 m$^2$/g |
|---|---|
| Pore Volume = | 0.25-0.55 cm$^3$/g |
| Real Density = | 3.00-5.00 g/cm$^3$ |
| Apparent Density = | 1.50-2.60 g/cm$^3$ |
| Bulk Crushing Strength of the calcined pellets = | 2-12 kg/cm$^2$ |
| Resistance to Abrasion = | 0-2% fines |
| Pore Volume (V$_P$), Radius >200 Angstroms = | 20%-65% |
| V$_P$, Radius >1000 Angstroms = | 8%-40% |
| and preferably: | |
| Surface Area = | 110-200 m$^2$/g |
| Pore Volume = | 0.3-0.5 cm$^3$/g |
| Real Density = | 3.50-4.70 g/cm$^3$ |
| Apparent Density = | 1.60-1.90 g/cm$^3$ |
| Bulk Crushing Strength of the calcined pellets = | 3-9 kg/cm$^2$ |
| Resistance to Abrasion = | 0-1% fines |
| Pore Volume (V$_P$), Radius >200 Angstroms = | 55-60% |
| V$_P$, Radius >1000 Angstroms = | 22-30% |

The resultant catalyst surface composition is characterized by novel and enhanced surface concentrations of the promoter elements, presented as atomic ratios between the elements, as determined by x-ray photoelectron spectroscopy surface analysis (XPS), Lucchesi et al., Jour. Chem. Ed 50 (5): A269 (May 1973), using Physics Electronics apparatus and using the relation of intensities of the corresponding bands at the following electron energy levels:

| Mo = 3d 5/2 | Al = 2p | Ti = 2p 3/2 |
|---|---|---|
| Fe = 2p 3/2 | Si = 2p 3/2 | P = 2p |

The atomic ratios of promoter to aluminum signal band intensities on the catalyst surface are found to fall within the following ranges:

|  | and preferably: |
|---|---|
| Mo/Al = 0.03-0.09 | Mo/Al = 0.04-0.07 |
| Fe/Al = 0.06-0.15 | Fe/Al = 0.08-0.12 |
| Si/Al = 0.08-0.30 | Si/Al = 0.10-0.20 |
| Ti/Al = 0.01-0.03 | Ti/Al = 0.01-0.02 |
| P/Al = 0.10-0.60 | P/Al = 0.15-0.50 |

These data and the data of the Examples (below) show that the concentrations of promoter additives (molybdenum and phosphorus) are greater at the reaction surface than they are within the body of the catalyst pellet generally.

The resultant catalyst is able to convert more than 50% of residue feedstocks at temperatures of about 410° C. to about to 420° C., a pressure of 2000 psi and residence time of 2 hours, in an agitated tank reactor, for a time period exceeding one month, without showing any significant deactivation. In this same period, a demetallization of more than 60% and a desulfurization of more than 50% by weight are consistently obtained. The formation of carbon in the used catalyst is less than 15% by weight.

In hydrocracking processes in accordance with this invention, a feedstock containing high boiling hydrocarbons and high levels of sulfur and vanadium is brought into contact with a catalyst, prepared as described above in the presence of added hydrogen and in a suitable contacting system, such as a stationary (fixed) catalyst bed, a downwardly moving (trickle) catalyst bed or a fluidized (ebullated) catalyst bed. Suitable process conditions include temperatures of about 400° to about 450° C. (752° to 842° F.), pressures from 1500 to 2500 psig, space velocities of about 0.1 to about 2.0 volumes of feed (at standard conditions) per reactor volume per hour (V/V/hr.), and preferably about 0.2 to about 1.0 V/V/hr., and a hydrogen feed rate from 2000 to 20,000 standard cubic feet per barrel of feed (SCFB), preferably 5000 to 11000 SCFB.

EXAMPLE 1

5000 Grams of PJ-1 Bauxite (from the Pijiguaos-Venezuela deposit) were ground and screened to less than 150 micron size, mixed with 500 grams of commercial starch, and homogenized for 2 hours in a powder mixer. 460 grams of technical grade ammonium heptamolybdate ((NH$_4$)$_6$Mo$_7$O$_{24}$.4H$_2$O) in 650 cc of water were mixed with 280 grams orthophosphoric acid (H$_3$PO$_4$) (85%; 1.77 g/cc) in 500 cc of water. The resulting solution was added to the powder mixture of bauxite and starch and the paste mixed for 15 minutes in a mixer. Additional water was added until the paste's rheology was appropriate for extrusion. The total volume of the added liquid was 1160 cc. The paste was kneaded in a mechanical kneader for another 15 minutes, and was then passed through the extruder at intermediate speed to obtain extruded pellets of 1/16" diameter.

The drying process took 48 hours at ambient temperature and 8 hours at 100° C. (212° F.). The calcination was carried out by raising the temperature at a rate of 5° C./minute to 500° C., where it then was held for 17 hours.

The elemental composition by weight of the resulting catalyst was as follows:
Al=28.00%
Fe=10.29%
Si=1.85%
Ti=0.67%
Mo=5.08%
P=2.28%

The atomic ratios at the catalyst surfaces of promoter elements to aluminum band intensities, as determined by x-ray photoelectron spectrocopy, compare with the atomic ratios of the total compositions, calculated from the above elemental weight composition, as follows:

|  | Surface (measured) | Total (calculated) |
|---|---|---|
| Mo/Al | 0.07 | 0.051 |
| Fe/Al | 0.11 | 0.178 |

-continued

|  | Surface (measured) | Total (calculated) |
|---|---|---|
| Si/Al | 0.27 | 0.063 |
| Ti/Al | 0.01 | 0.013 |
| P/Al | 0.46 | 0.071 |

As may be seen from the above comparison, the catalyst of Example 1 has an increased surface concentration of molybdenum and a substantially increased surface concentration silicon and phosphorus as compared to the total concentration.

The characteristics obtained in the catalyst were:

| Surface Area = | 125 m$^2$/g |
|---|---|
| Pore Volume = | 0.31 cm$^3$/g |
| Real Density = | 2.52 g/cm$^3$ |
| Apparent Density = | 1.69 g/cm$^3$ |
| Bulk Crushing Strength of the calcined pellets = | 7.39 kg/cm$^2$ |
| Resistance to Abrasion = | 0.06% fines |
| Pore Volume (V$_P$), Radius >200 Angstroms = | 51.29% |
| V$_P$, Radius >1000 Angstroms = | 23.55% |

Activity tests were then carried out in two types of units. Initial activity tests took place in an autoclave under the following conditions:
Pressure: 1500 psi
Time: 60 minutes
Agitation: 1000 rpm Long-term stability tests were carried out using a continuous hydrotreatment trickle bed reactor during periods of one week under the following conditions:
Temperature: 410° C.
Pressure: 1500 psig
Liquid/Hourly Space Velocity: 0.5 vol./vol.-hr.
Volumetric Ratio, H$_2$/Feed: 800 m$^3$(STP)/m$^3$ In both tests, the feedstock used was Morichal Crude with the following characteristics:
Specific Gravity, °API: 11° API
[S]: 2.8%
[V]: 321 ppm
Percentange Asphaltenes: 9.7%

The results in the autoclave tests were:
Hydrodesulfurization: 48%
Hydrodevanadization: 83%
Spec. gravity, °API: 21.7
%Δ(°API): 97.27
%C in used catalyst: 8.70

Figure 2:
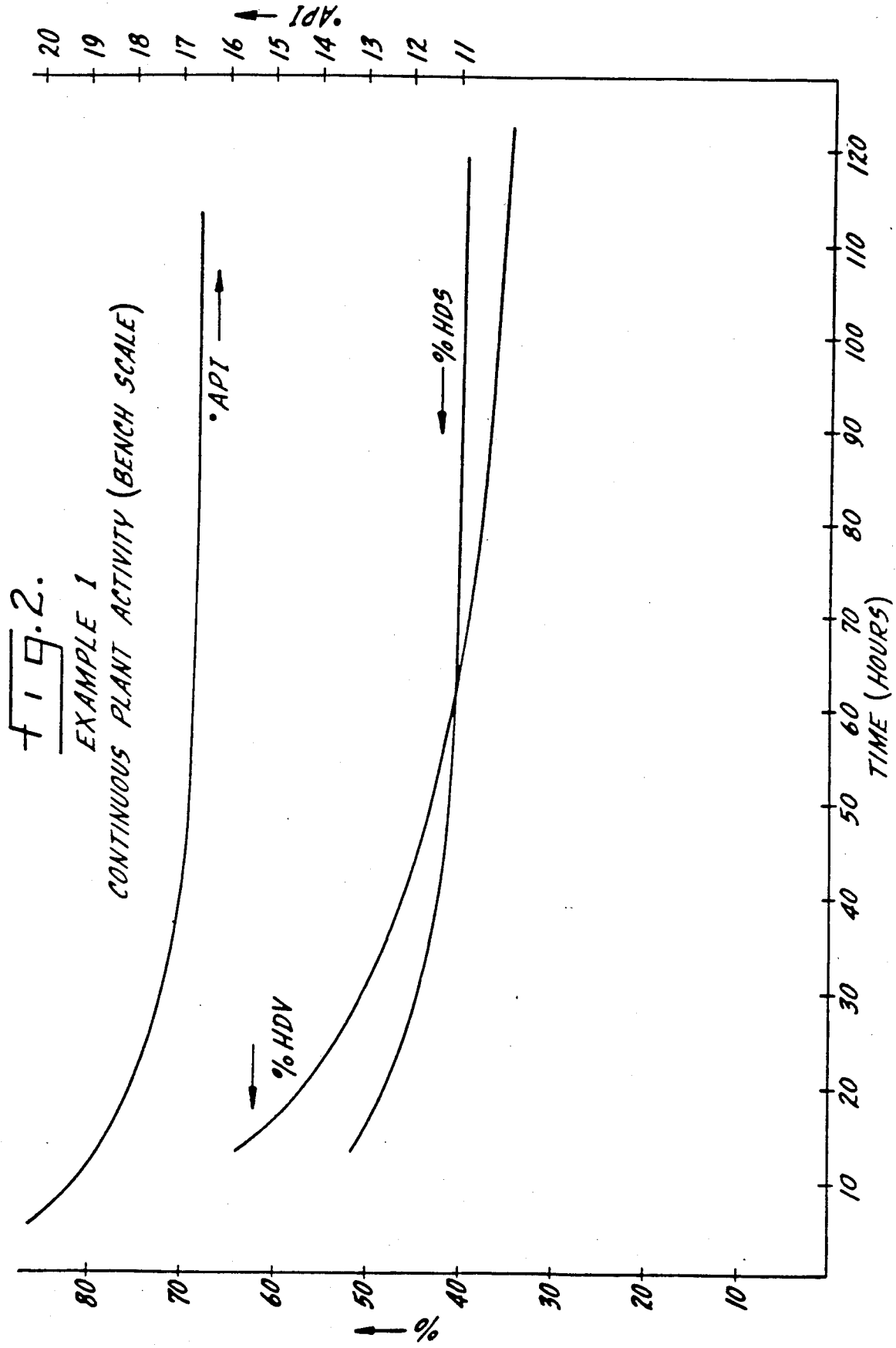
FIG. 2 is a graph of three curves showing specific gravity, hydrodevanadization (HDV) and hydrodesulfurization (HDS) of a hydrocarbon feedstock as a function of reaction time under the conditions and with the catalyst specified in Example 1.

The results of activity in the trickle bed reactor on an experimental scale are shown in FIG. 2. The treated residue yielded 65% by weight of 500° C.(−) distillates.

EXAMPLE 2

1000 Grams of PJ-1 bauxite were ground and screened to a size of less than 150 microns and were then mixed with 100 grams commercial starch and homogenized for 2 hours in a powder blender. A solution was prepared in which 36 grams of technical-grade ammonium heptamolybdate in 65 cc of water were mixed with 55 cc of orthophosphoric acid (85%; 1.77 g/cc) in 100 cc of water. The resulting solution was added to the powder mixture of bauxite and starch, the paste remaining for 15 minutes in a mixer. Additional water was added until the paste showed a good rheology for extrusion. The total volume of added liquid was 235 cc. The paste was left in the kneader for another 15 minutes, and was then passed through the extruder at a minimum speed, with 1/16" extrusion pellets being obtained.

The drying process lasted 72 hours at ambient temperature and 16 hours at 120° C. (248° F.). The pellets were then calcined for 3 hours at 300° C. and 3 hours at 500° C.

The elemental composition by weight of the resulting catalyst was:
29.46% Al
11.18% Fe
1.62% Si
0.74% Ti
2.75% Mo
2.65% P Surface atomic composition, as measured by x-ray photoelectron spectroscopy signal band strength ratios, was compared with total composition, as calculated from the above elemental composition, as follows:

|  | Surface (measured) | Total (calculated) |
|---|---|---|
| Mo/Al | 0.05 | 0.026 |
| Fe/Al | 0.12 | 0.18 |
| Si/Al | 0.09 | 0.053 |
| Ti/Al | 0.01 | 0.013 |
| P/Al | 0.47 | 0.078 |

As in Example 1, the data shows increases in surface concentrations of molybdenum, silicon and phosphorus, as compared to the total composition.

The physical characteristics of the catalyst were:

| Surface Area = | 151 m$^2$/g |
|---|---|
| Pore Volume = | 0.31 cm$^3$/g |
| Real Density = | 2.52 g/cm$^3$ |
| Apparent Density = | 1.69 g/cm$^3$ |
| Bulk Crushing Strength of the Pellets = | 3.73 kg/cm$^2$ |
| V$_P$, Radius >200 Angstroms = | 51.43% |
| V$_P$, Radius >1000 Angstrom = | 26.57% |

The activity test results in the autoclave at the conditions and with the feedstock mentioned in Example No. 1 were:
Hydrodesulfurization: 36.00%
Hydrodevanadization: 56.00%
Spec. gravity, °API: 19.9°
%Δ(°API): 80.90
%C in used catalyst: 9.64

Figure 3:
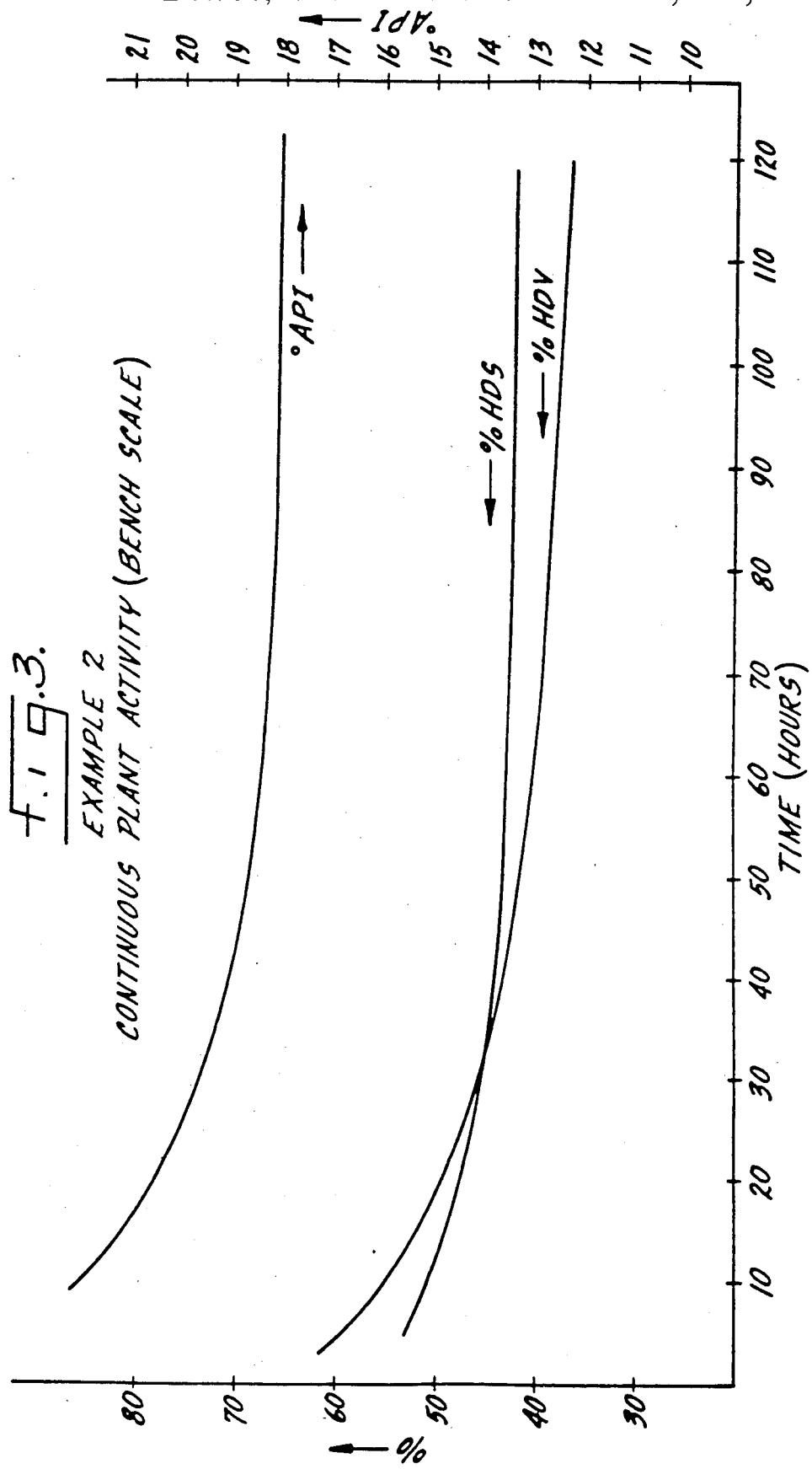
FIG. 3 is a graph of three curves showing specific gravity, hydrodevanadization and hydrodesulfurization of a hydrocarbon feedstock as a function of reaction time under the conditions and with the catalyst specified in Example 2.

The activity results in the continous hydrotreatment unit at experimental scale are shown in FIG. 3. Distillation of the treated residue yielded 70% of products boiling at 500° C.(−).

EXAMPLE 3

500 Grams of PJ-1 Bauxite screened to below 150 microns were mixed with 50 grams commercial starch and homogenized for 2 hours in a powder mixer. 28 cc of H$_3$PO$_4$ solution (85%; 1.77 g/cc) was added along with 50 cc of water. The resultant paste was blended and then kneaded for 15 minutes. Additional water was added until the paste showed a good rheology for extrusion. The total volume of added liquid was 118 cc. The paste was then left in a mixer for another 15 minutes.

The paste was passed through the extruder at minimum speed with extrusion products of 1/16" diameter being obtained.

The drying process was carried out at room temperature for 72 hours and at 100° C. for 16 hours. The calcination lasted 24 hours at 300° C. and 16 hours at 500° C.

The elemental composition by weight of the resulting catalyst was:
28.32% Al
10.06% Fe
1.64% Si
0.87% Ti
2.48% P The surface atomic composition of the catalyst obtained as measured by the method in Example 1 was compared with the calculated total atomic composition as follows:

|  | Surface (measured) | Total (calculated) |
|---|---|---|
| Fe/Al | 0.11 | 0.17 |
| Si/Al | 0.08 | 0.056 |
| Ti/Al | 0.01 | 0.017 |
| P/Al | 0.30 | 0.076 |

The data shows an increase in concentration at the catalyst surfaces of silicon and phosphorus.

The physical conditions of the catalyst obtained were:

| Surface Area = | 140 m² |
|---|---|
| Pore Volume = | 0.30 cm³/g |
| Real Density = | 3.35 g/cm³ |
| Apparent Density = | 1.66 g/cm³ |
| Bulk Crushing Strength of the Calcined Pellets = | 2.10 kg/cm² |
| $V_P$, Radius >200 Angstroms = | 16.66% |
| $V_P$, Radius >1000 Angstroms = | 5.33% |

The activity test results in the autoclave with the previously mentioned feedstock and conditions were:
Hydrodesulfurization: 24.00%
Hydrodevanadization: 27.00%
Spec. gravity, °API: 18.00%
%Δ(°API): 63.64
%C in used catalyst: 10.5

Figure 4:
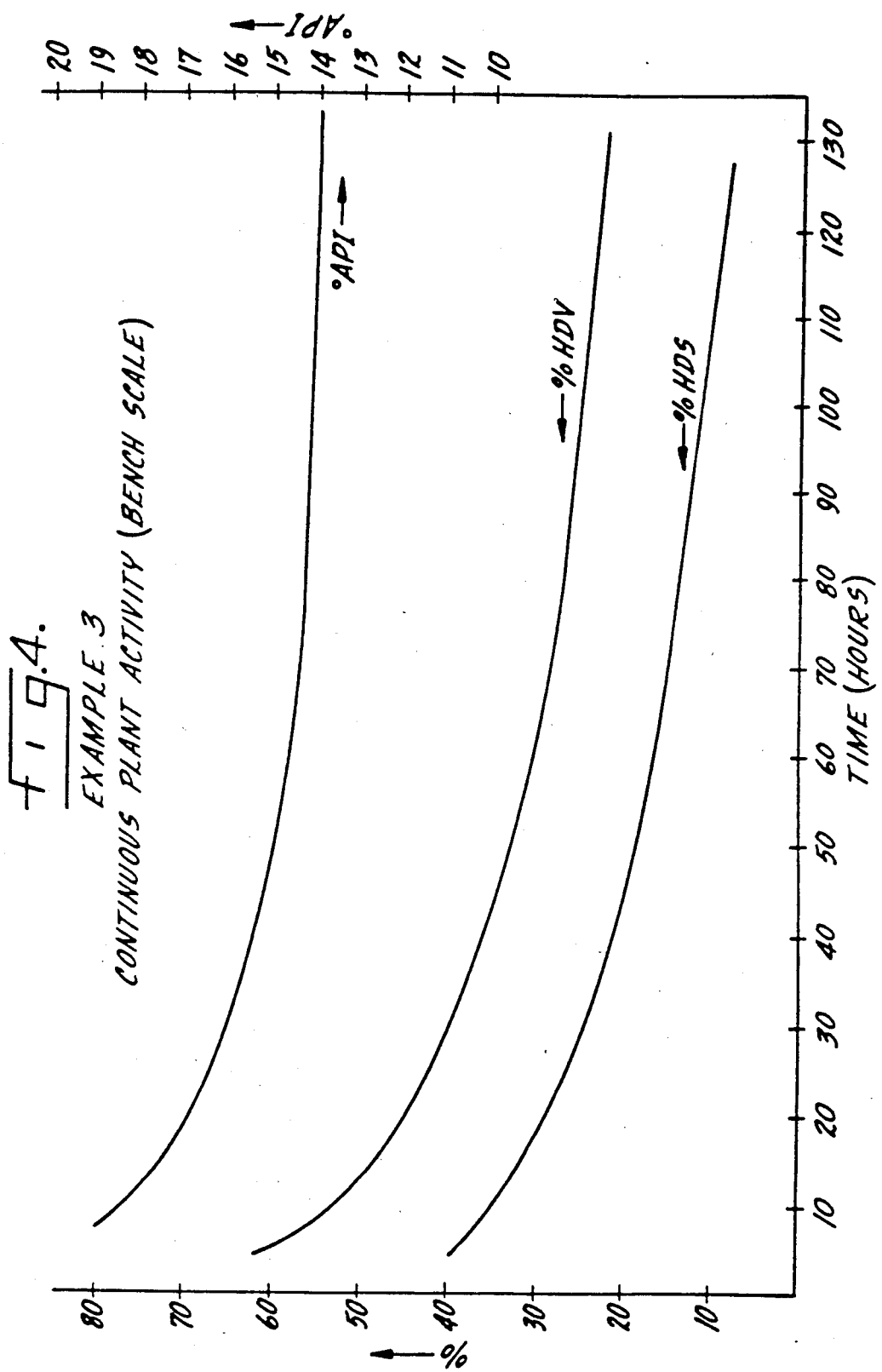
FIG. 4 is a graph of three curves showing specific gravity, hydrodevanadization and hydrodesulfurization of a hydrocarbon feedstock as a function of reaction time under the conditions and with the catalyst specified in Example 3.

The activity results in a continuous trickle bed hydrotreatment reactor using the catalyst are shown in FIG. 4.

EXAMPLE 4

500 Grams of PJ-1 Bauxite in a screened size of less than 150 microns were impregnated with a 12 g. of technical grade ammonium heptamolybdate solution in 625 cc water. After 3 hours in contact, the excess liquid is removed and the sample is dried for 16 hours in a stove at 120° C. and calcined for 8 hours at 550° C.

The elemental composition by weight of the resulting catalyst was:
30.03% Al
9.93% Fe
1.92% Si
0.63% Ti
4.68% Mo The surface atomic ratios of the resulting catalyst, as measured by the method described in Example 1, was compared with the calculated total atomic ratios as follows:

|  | Surface (measured) | Total (calculated) |
|---|---|---|
| Mo/Al | 0.05 | 0.044 |
| Fe/Al | 0.11 | 0.16 |
| Si/Al | 0.15 | 0.061 |
| Ti/Al | 0.01 | 0.012 |

The data shows an increase in surface concentration of molybdenum and silicon.

The resulting physical characteristics were:

| Surface Area = | 178 m² |
|---|---|
| Pore Volume = | 0.31 cm³/g |
| Real Density = | 4.59 g/cm³ |
| Apparent Density = | 1.88 g/cm³ |
| $V_P$, Radius >200 Angstroms = | 20.13% |
| $V_P$, Radius >1000 Angstroms = | 8.12% |

The activity test results in the autoclave showed that this catalyst was much less active than the catalysts of Examples 1, 2, and 3, so the test conditions were changed as follows:
Temperature: 420° C.
Pressure: 2000 psi
Agitation: 1250 rpm
The initial activity as presented was then:
Hydrodesulfurization = 35.00%
Hydrodevanadization = 65.00%

EXAMPLE 5

A feed stock of Venezuelan heavy crude oil (Cerro Negro) was subjected to a two-stage treatment using fluidized (ebullated) bed reactors. The first stage was a hydrocracking stage using the catalyst of Example 1 under conditions of moderate severity.

The operating conditions of the hydrocracking stage, the feedstock properties, the product yields and percent of conversion are shown in Table 1.

TABLE 1
OPERATING CONDITIONS AND PROPERTIES OF THE FEEDSTOCK AND THE HYDROCRACKING PRODUCT PROCESSING CERRO NEGRO CRUDE OIL

| Operating Conditions | |
|---|---|
| Temperature (°F.) | 790–830 |
| Pressure (psig) | 2000 |
| Space Velocity (h⁻¹) | 0.3–1.0 |
| H₂/Feed rate (SCFB) | 5000–11000 |
| Feedstock Properties | |
| °API | 8.0 |
| S (wt %) | 4.03 |
| V (ppm) | 515 |
| Asph. C₇ (wt %) | 14.7 |
| Con. Carb. (wt %) | 15.3 |
| Distillation Yields (wt %/feed) | |
| C₅–375° F. | 2.4 |
| 375–650° F. | 8.9 |
| 650–950° F. | 21.2 |
| 950° F.+ | 67.5 |
| Product Yields (wt %/feed) | |
| H₂S + NH₃ | 3.0 |
| C₁–C₄ | 3.2 |
| C₅+ | 93.7 |
| Conversion | |
| HDS (%) | 62.2 |
| HDV (%) | 64.2 |
| 950° F.+ (vol %) | 75.0 |

EXAMPLE 6

Urdaneta Long residue feedstock was first demetallized using a conventional Ni and Mo catalyst (K153 S) and then subjected to a hydrocracking treatment in a fixed bed reactor with the catalyst of Example 1. The operating conditions, feedstock properties and percent conversions are shown in Table 2.

TABLE 2
OPERATING CONDITIONS, FEED PROPERTIES AND CONVERSION LEVELS DURING THE HYDROCRACKING

Operating Conditions
(for demetallization stage and hydrocracking stage)

| | | |
|---|---|---|
| Temperature (°F.) | 800 | |
| Pressure (psig) | 1,800 | |
| Space Velocity (h$^{-1}$) | 0.5 | |
| H$_2$/feed rate (SCFB) | 8,000 | |

| Feed Properties | Before Demetallization | After Demetallization |
|---|---|---|
| °API | 9.6 | 15.5 |
| S (wt %) | 3.55 | 0.99 |
| V (ppm) | 664 | 180 |
| Asph. C$_7$ (wt %) | 8.28 | 4.65 |
| Con. Carb. (wt %) | 14.74 | 9.48 |
| Yield 950° F.+ (vol %) | 70.0 | 49.7 |

| Conversion | Demetallization | Hydrocracking | Total |
|---|---|---|---|
| HDS (%) | 72 | 41 | 83 |
| HDV (%) | 73 | 57 | 88 |
| 950° F.+ conv. (vol %) | 29 | 29 | 50 |

EXAMPLE 7

For comparison purposes, two hydrocracking processes were carried out with a Cerro Negro crude feedstock in a fixed bed experimental reactor, operating under identical conditions of pressure, temperature, space velocity and hydrogen feed rate. One process was carried out with the catalyst of Example 1, the other (for comparative purposes) with a catalyst containing 1 wt-% Mo on bauxite ("Porocel") and prepared by impregnation with ammonium heptamdybdate for 8 hours, followed by drying at 120° C. and calcination in air at 500° C. for 24 hours.

The respective catalyst compositions were as follows:

| | Cat. A | Cat. H |
|---|---|---|
| Al | 28.00 wt % | 39.6 wt % |
| Fe | 10.29 wt % | 1.40 wt % |
| Si | 1.85 wt % | 2.57 wt % |
| Ti | 0.67 wt % | 1.80 wt % |
| Mo | 5.80 wt % | 1.00 wt % |
| P | 2.28 wt % | 0 |

The properties of the feedstock, and the conversion results with the catalyst of this invention (designated as "Cat. A") and the comparative catalyst (designated as "Cat. H") are shown in Table 3. The data shows that while the catalyst of this invention is somewhat less effective than the comparative catalyst in hydrodesulfurization and hydrodevanadization, it is almost twice as effective for hydrocracking.

TABLE 3
ACTIVITY COMPARISON BETWEEN THE BAUXITE HYDROCRACKING CATALYST, OBJECT OF THIS INVENTION (A) AND A COMPETITIVE BAUXITE CATALYST (H)

Feedstock Properties (Cerro Negro Long Residue)

| | | |
|---|---|---|
| °API | 5.3 | |
| S (w %) | 4.4 | |
| Asph. (C$_7$) (wt %) | 13.5 | |
| V (ppm) | 520 | |
| Yield (950° F.+) (vol %) | 77 | |

| Conversion | Cat. "A" | Cat. "H" |
|---|---|---|
| HDS (%) | 55 | 60 |
| HDV (%) | 62 | 83 |
| 950° F.+ Conv. (vol %) | 80 | 44 |

The invention has been described with respect to its preferred embodiments. It will be understood by those skilled in the art that modifications may be made within the teachings of the invention as defined in the appended claims.

What is claimed is:

1. A method for the preparation of a hydrocracking catalyst which comprises blending bauxite having a particle size less than about 500 microns and having a composition with the following ranges in weight percent:

Al=22–47%
Fe=5–28%
Si=1–13%
Ti=1–7% with from about 1 to about 7 weight percent (based on the weight of bauxite) of a molybdenum salt, with from about 1 to about 8 weight percent phosphoric acid, and sufficient water to produce a paste of rheology suitable for extrusion, extruding said blend to form extrudable pellets having a diameter no greater than about ⅛ inch, drying the extruded pellets in two stages: a first stage at room temperature for a time period of about 8 to about 72 hours and a second stage at a temperature of about 60° to about 120° C. (about 140° to about 248° F.) for a time period of about 8 to about 72 hours, and thereafter calcining the dried pellets at a temperature of about 300° to about 600° C. (about 572° to about 1112° F.) for a time period of about 3 to about 24 hours to produce dried and calcined pellets having a molybdenum and phosphorus concentration at the pellet surface that is greater than the molybdenum and phosphorus concentration within the body of the pellet and a pore volume wherein 20 percent to 65 percent of the pores have a radius of more than about 200 Angstroms and 8 percent to 40 percent of the pores have a radius of more than about 1000 Angstroms.

2. The method of claim 1 wherein the molybdenum salt is ammonium heptamolybdate and the phosphoric acid is orthophosphoric acid.

3. The method of claim 1 wherein said phosphoric acid is orthophosphoric acid.

4. The method of claim 1 wherein said molybdenum salt is ammonium heptamolybdate.

5. The method of claim 1 wherein there is also blended with said bauxite from about 1 to about 15 weight percent, based on the weight of the bauxite, of a lubricating and porosity-generating additive of the group consisting of starch, polyvinyl alcohol and polyethylene glycol.

6. The method of claim 4 wherein there is also blended with said bauxite orthophosphoric acid as said phosphoric acid and from about 3 to about 10 weight percent of starch (based on the weight of bauxite).

7. The method of claim 1 wherein said bauxite has a particle size less than about 150 microns.

8. The method of claim 1 wherein said dried pellets are heated to said calcination temperature at a rate of about 5° C./minute and maintained at said calcination temperature for a time period of about 8 hours.

9. The method of claim 1 wherein said calcination is carried out in a stream of air at a stream velocity which maintains a heat transfer coefficient in excess of 15 Kcal/(hour)/(m²)(°C.).

10. The method of claim 9 wherein said heat transfer coefficient is in excess of 40 Kcal/(hour)(m²)(°C.).

* * * * *